INVENTORS
EDMUND G. SMITH
OTELL M. COCCHIARELLA
BY
ATTORNEY

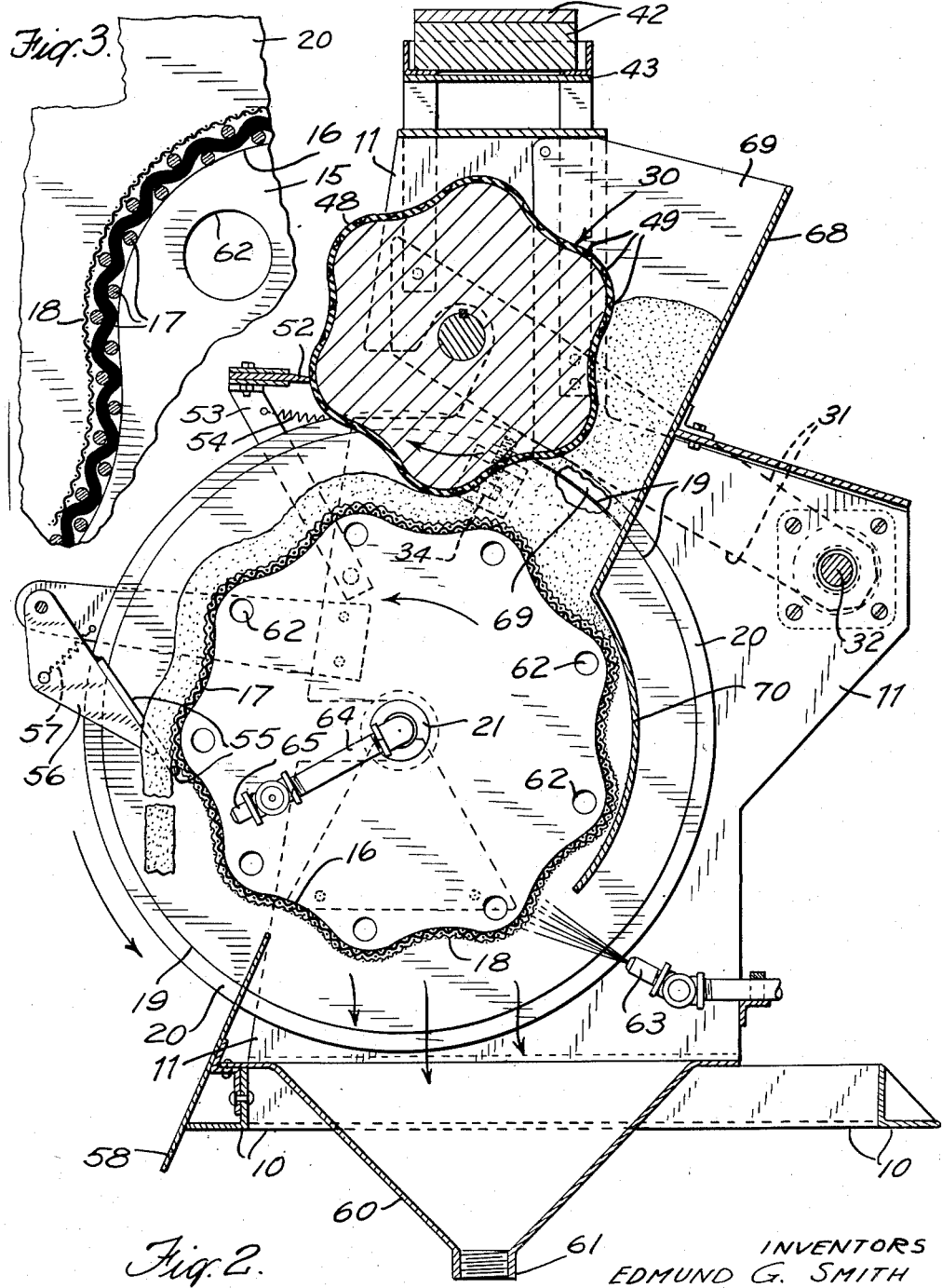

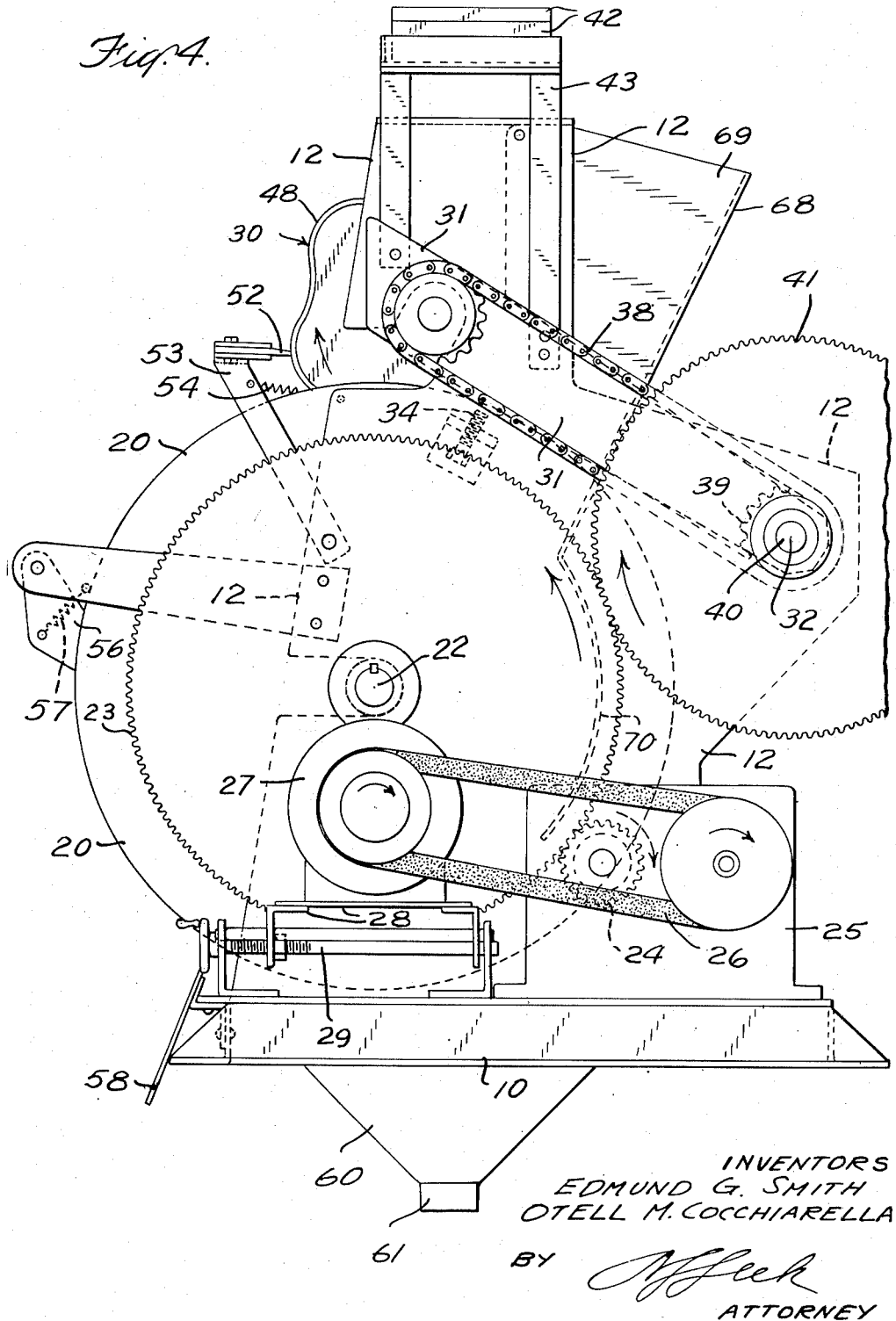

United States Patent Office 2,798,424
Patented July 9, 1957

2,798,424
FILTER

Edmund G. Smith, Cedar Grove, and Otell M. Cocchiarella, Verona, N. J., assignors to Equipment Development Co., Inc., Montclair, N. J., a corporation of New Jersey Application April 14, 1955, Serial No. 501,344

3 Claims. (Cl. 100—174)

This invention relates to filters and more particularly to a filter which is suited for the final dewatering of sewage sludge or the like to the extent necessary for conditioning the sludge for feeding to an incinerator.

An object of the invention is to provide a filter of the above type having novel and improved characteristics.

Another object is to provide a filter thickener which effects the final dewatering of the sludge without subjecting the sludge to a pressure which would tend to break down the solid particles or to cause the solid particles to become wedged in the filter medium.

Another object is to provide a filter of the above type which is self-cleaning and is capable of operating over long periods of time.

Another object is to provide a filter of the above type which is capable of operating at progressively increasing pressures as the water is eliminated from the sludge, while maintaining the optimum filtering pressure at all times.

Another object is to provide a filter of the above type capable of producing dewatered sludge at a uniform rate.

Another object is to provide a filter of the above type capable of producing dewatered sludge at a uniform moisture content.

Other objects and advantages will be apparent as the nature of the invention is more fully disclosed.

The invention will be better understood by referring to the following description, taken in connection with the accompanying drawings in which a specific embodiment thereof has been set forth for purposes of illustration.

In the drawings:

Fig. 2 is a vertical section taken on the line 2—2 of Fig. 1;

Fig. 3 is an enlarged detail view showing the construction of the filter drum; and Fig. 4 is a side elevation of the filter.

Figure 1:
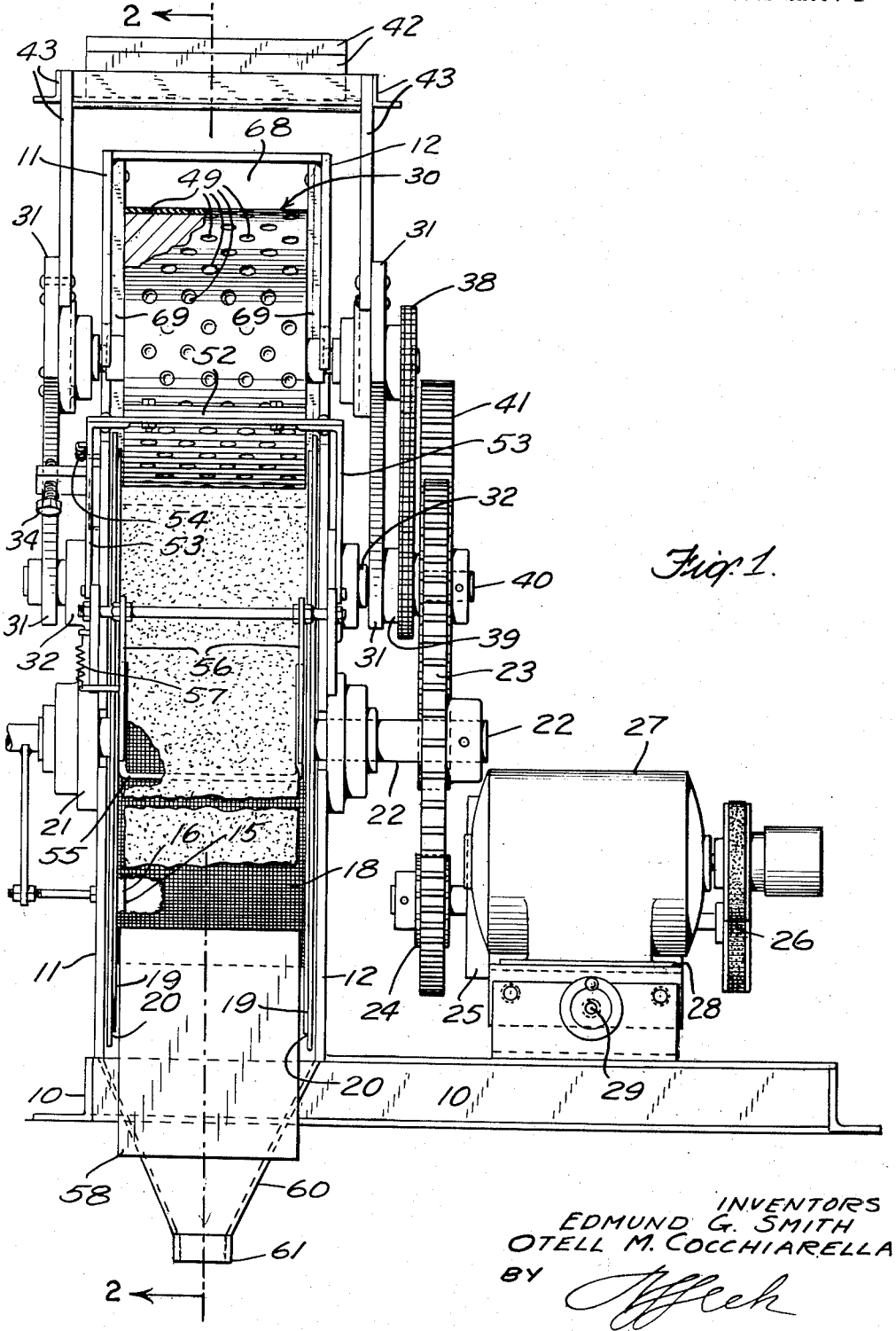
Fig. 1 is a front elevation of a filter embodying the present invention.

Referring to the drawings more in detail, the filter is shown as comprising a supporting base 10 carrying side frames 11 and 12 on which the various elements are supported. A pair of end plates 15 have shoulders 16 on which a filter medium such as a wire screen 17 is supported in the form of a fluted cylinder. The screen 17 may be welded or otherwise secured to the end plates 15. A second filter medium such as a filter fabric 18 is disposed over and supported by the filter screen 17 and likewise takes the form of a fluted cylinder. The end plates 15 are formed with annular shoulders 19 and with peripheral flanges 20 which extend above the surface of the screen to confine the sludge to be filtered.

One end plate 15 is journaled on a hollow trunnion 21 mounted in the side frame 11. The other end plate 15 is mounted on a shaft 22 which is journaled in the side frame 12. The shaft 22 carries a gear 23 driven by a gear 24 through a reducing gear box 25 which is driven by a belt 26 from a motor 27 through a Reeves variable speed pulley of standard construction. The motor 27 is mounted on a base 28 which is adjustable for varying the speed of the drive by means of a threaded rod 29.

A fluted drum 30, which may be of smaller diameter than the screen 17 and may be solid in section, is journaled on arms 31 which are pivotally suported as at 32 on the side frames 11 and 12. A stop, shown as a set screw 34, is provided to limit the downward movement of the arms 31.

The drum 30 is formed with a fluted surface having raised and depressed portions which conform to the contour of the fluted screen 17 and mesh therewith when the two members are rotated in unison. The drum 30 fits between the flanges 20 of the end plates 15 to confine the material to be filtered and is rotated by a chain 38 driven by a sprocket 39 mounted on a shaft 40 coaxial with the pivot points 32 of the arms 31, carrying a gear 41 meshing with the gear 23.

The arrangement is such that the two elements are positively driven in synchronism regardless of changes in elevation of the drum 30. The drum 30 may be loaded with a weight 42 carried in a frame 43 which is attached to the arms 31. The weight 42 may be varied according to the pressure to be exerted on the filter material.

The drum 30 is provided with a surface layer 48 of soft material such as rubber which may be removed as desired. The material 48 may be provided with pockets 49 to assist in compressing and feeding the material as will be described. A scraper blade 52 is mounted on a frame 53 and held in pressure engagement with the surface of the member 48 by means of a spring 54. Similarly a scraper wire 55 is mounted on pivoted brackets 56 and held in pressure engagement with the surface of the filter cloth 18 by means of a spring 57.

A discharge chute 58 is positioned to receive the material which falls from the surface of the filter cloth 18. The liquid which passes through the screen is collected in a drain 60 and discharged through an opening 61. The end plates 15 are provided with drain openings 62. A suitable spray head 63 is positioned to direct a spray of liquid or an air blast onto the outer surface of the screen for cleaning the surface of the screen. A wash liquid or air blast may also be directed onto the inner surface of the screen 17 by a pipe 64 extending through the hollow trunion 21 and terminating in a spray head 65. This spray or air blast assists in stripping the concentrated material from the screen.

The material to be filtered is fed from a hopper 68 the lower end of which communicates with the space between the screen 17 and the drum 30. The hopper is formed by side walls 69 registering at the bottom with the annular shoulder 19 on the end plates 15 and with a back wall 70 which extends over a portion of the periphery of the screen 17 to form a seal for the material being filtered.

In the operation of this device the partially dewatered sludge for thickening in the filter unit is fed into the hopper 68. The rotation of the fluted drum 30 and screen 17 in spaced relationship causes the material to be picked up in the pockets between the fluted surfaces and to be progressively fed along between the surfaces with an increasing pressure. The pressure causes the water to be progressively removed through the screen 17 and causes the solids to form a cake or layer on the surface of the screens. The solids adhere to the surface of the screen and as they pass the stripping wire 55 are stripped from the surface of the screen and form onto the chute 58. The water passes through the screen 17 and assists in removing any particles that may have adhered to the screen.

The shape of the fluted drum 30 and screen 17 should be such that the spacing between the surface of the drum 30 and the screen 17, measured along a line joining the two axes, is a constant at all times. It is necessary to maintain this constant spacing to provide a seal for the contained sludge as it is subjected to pressure. Otherwise the sludge would escape when pressure builds up between the drum 30 and the screen 17. Furthermore at the point of seal, which is where the two surfaces are closest together, the two surfaces must move at like speed. If the surfaces move at different speeds at this point the dewatered cake is sheared or disrupted and enmeshes with the bottom screen 17.

Any solid material which adheres to the drum 30 is removed by the scraper 52 and falls onto the layer of material on the screen 17 from which it eventually falls onto the chute 58.

It has been found that material such as sewage sludge has a critical filtering pressure which must not be exceeded and which increases as the sludge becomes dewatered. Pressures in excess of this critical pressure tend to break down the solids and embed them in the mesh of the filter screen. The fluted cylinder and drum above described automatically provide for this increase in pressure as the sludge is progressively dewatered and compacted between the cylinder and drum and, at the same time, the maximum pressure can be controlled so as not to exceed the above mentioned critical value.

The pressure is controlled by the weight 42 which may be altered as desired. In the event that large solid particles pass through the filter the drum 30 is free to be elevated so as to permit passage of such particles without injury to the apparatus. In addition the floating action of the drum 30 permits the entire pressure to be exerted upon the material at all times.

It is to be further noted that the drum 30 exerts a pressure which is generally perpendicular to that of the material, thereby eliminating any shearing action which would tend to shear the particles and cause them to become embedded in the filter medium.

The sprays 63 and 65 provide for washing and cleaning the apparatus. This is particularly important in the case of material which is subject to decomposition. Compressed air may be supplied from the spray head 65 if desired to assist in the discharge of the solids from the screen 17.

Although a specific embodiment of the invention has been shown it is to be understood that changes and adaptations may be made therein as will be apparent to a person skilled in the art. The upper drum, for example, may be arranged with an endless belt around it which would extend out and away from the drum, in the form of a loop so that the dewatered sludge would be carried on the belt to a point external to the drum and discharged by scraper means. Also the bottom screen may have a series of endless strings, wires, coiled springs, or the like, passed around it to carry the dewatered sludge as on a conveyor, to an external point to be discharged. The bottom screen may have a very open mesh for support only. The filtering surface may be a continous and endless screen passed around the bottom drum so as to carry the dewatered sludge out and away from the bottom drum at some external point.

In another modification the upper drum may ride inside of the bottom drum instead of outside as shown.

What is claimed is:

1. A continuous filter for the final dewatering of sewage sludge or the like, comprising a cylindrical filter screen having in transverse section a series of flutes extending around its periphery, a drum having a similarly fluted peripheral surface; means mounting said drum above said screen for free vertical movement to rest upon the material being filtered on said screen so as to exert filtering pressure thereon due to its weight and to vary its spacing from said screen in response to variations in the quantity of material thereon, the peripheral surfaces of said screen and drum being shaped to provide a constant clearance therebetween along the center line adjoining the respective axes when the screen and drum are rotated about fixed axes, means rotating said screen and said drum in synchronism with said fluted surfaces intermeshing to form a wavy filtering zone therebetween, and means feeding the material for filtering into said filtering zone whereby the fluted surfaces form pockets to grip and advance the material along said zone under a pressure which increases to a predetermined constant value at said center line, to thereby discharge the liquid through said screen and cause the solids to form a layer thereon, and stripping means to strip said layer of solids from said screen.

2. In a filter as set forth in claim 1, side flanges disposed on opposite ends of said cylindrical screen to confine the material for filtering to the space between said screen and said drum.

3. In a filter as set forth in claim 2, a hopper having side plates registering with said flanges and having a back plate disposed over a portion of said screen to confine the material to said space.

References Cited in the file of this patent

UNITED STATES PATENTS

| 579,335 | Banister | Mar. 23, 1897 |
| 670,963 | Logemann et al. | Apr. 2, 1901 |
| 1,755,214 | Furbush | Apr. 22, 1930 |

FOREIGN PATENTS

| 1,615 | Great Britain | 1898 |